United States Patent [19]

Nakano et al.

[11] Patent Number: 5,111,864
[45] Date of Patent: May 12, 1992

[54] HEAVY DUTY PNEUMATIC RADIAL TIRES WHOSE BELT INCLUDES A PAIR OF NARROW-WIDTH AUXILIARY PROTECTIVE STRIPS

[75] Inventors: Minoru Nakano, Koganei; Akihito Goto; Yoichi Nakamura, both of Kodaira, all of Japan

[73] Assignee: Bridgestone Corporation, Tokyo, Japan

[21] Appl. No.: 430,466

[22] Filed: Nov. 2, 1989

Related U.S. Application Data

[63] Continuation-in-part of Ser. No. 288,933, Dec. 23, 1988, abandoned.

[30] Foreign Application Priority Data

Dec. 25, 1987 [JP] Japan ............................ 62-195964[U]

[51] Int. Cl.⁵ ............................ B60C 9/18; B60C 9/20
[52] U.S. Cl. .................................. 152/527; 152/526; 152/536
[58] Field of Search ............... 152/526, 531, 534, 535, 152/536, 538, 528

[56] References Cited

U.S. PATENT DOCUMENTS

| | | | |
|---|---|---|---|
| 4,420,025 | 12/1983 | Ghilardi et al. | 152/531 |
| 4,446,905 | 5/1984 | Tamura et al. | 152/536 |
| 4,865,103 | 9/1989 | Kobayashi et al. | 152/536 |
| 4,924,927 | 5/1990 | Kawabata et al. | 152/531 |

FOREIGN PATENT DOCUMENTS 63-125406  5/1988  Japan .................................. 152/526

*Primary Examiner*—Michael W. Ball
*Assistant Examiner*—Adrienne C. Johnstone
*Attorney, Agent, or Firm*—Sughrue, Mion, Zinn, Macpeak & Seas

[57] ABSTRACT

A heavy duty pneumatic radial tire running on rough road at high speed and having plural belt layers of steel cords comprises at least a pair of auxiliary protective strips superimposed on the belt layer so as to cover both end portions of the belt layer and protrude outward from the end portion, wherein cords of the auxiliary protective strips are inclined at an angle of 25°-25° with respect to the circumferential direction of the tire and are the same direction as in the cord direction of the belt layer supporting the auxiliary protective strips.

12 Claims, 5 Drawing Sheets

FIG._2
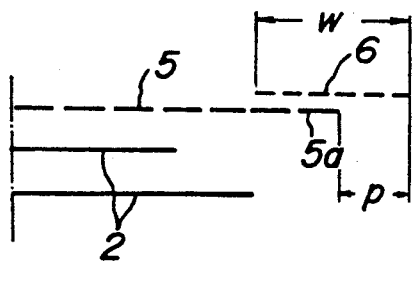
FIG._3
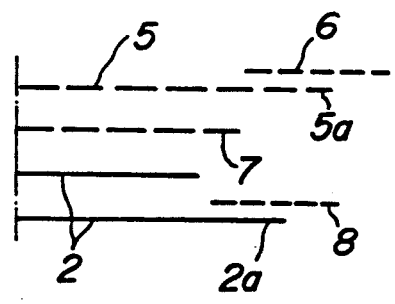
FIG._4a
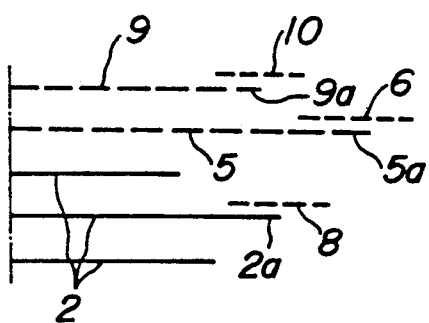
FIG._4b
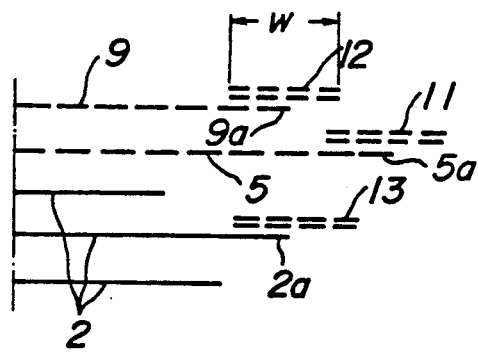
FIG._4c
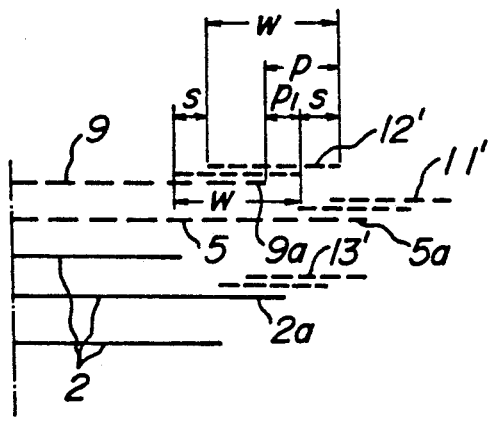
FIG._4d
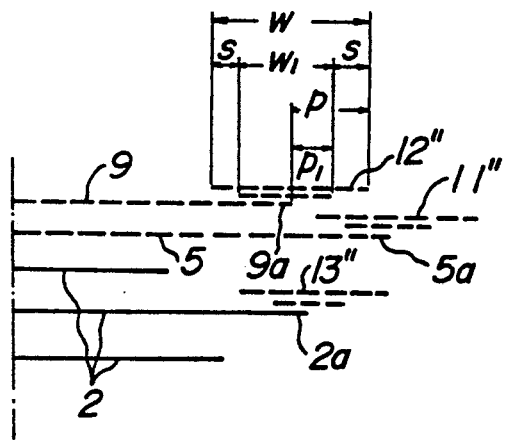

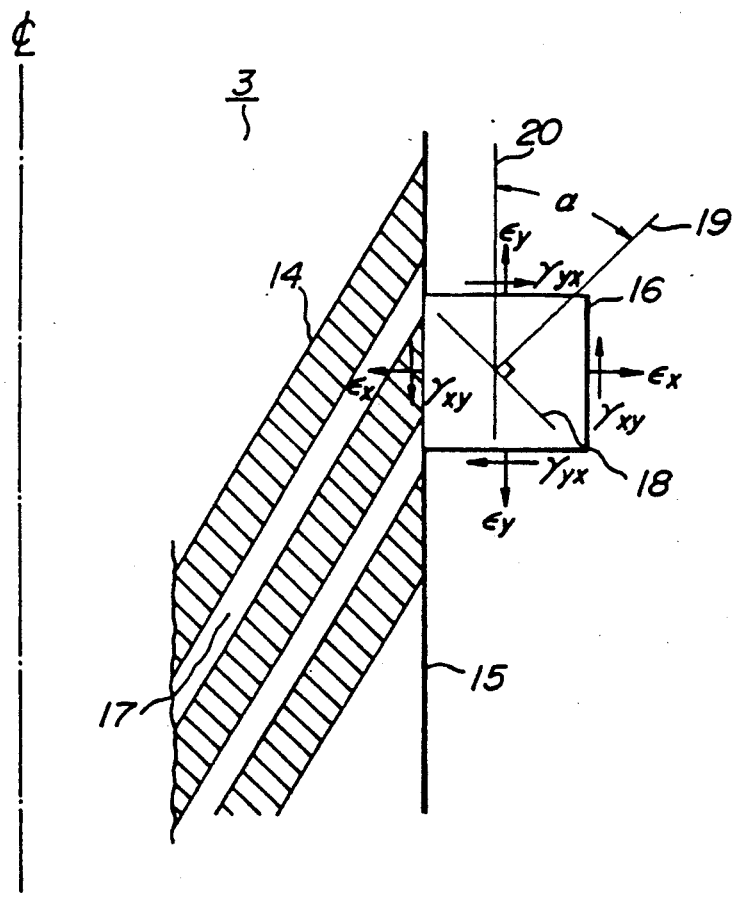
FIG_5

FIG_6
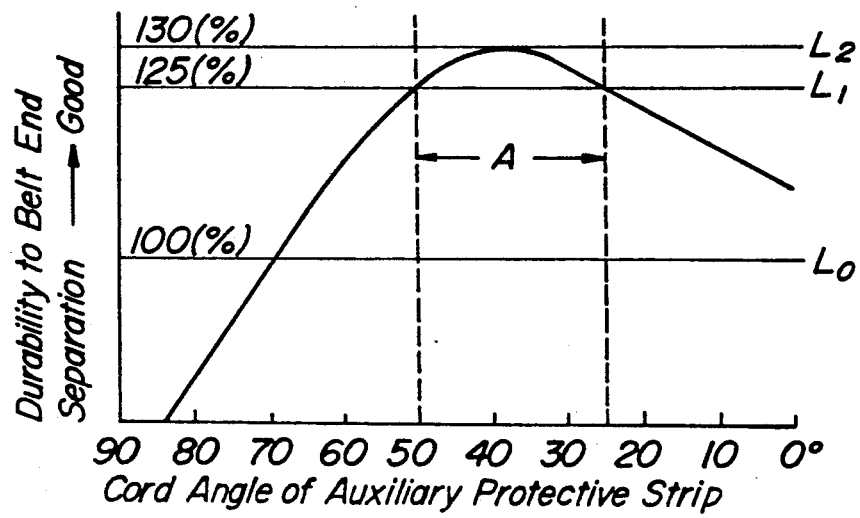
FIG_7
PRIOR ART
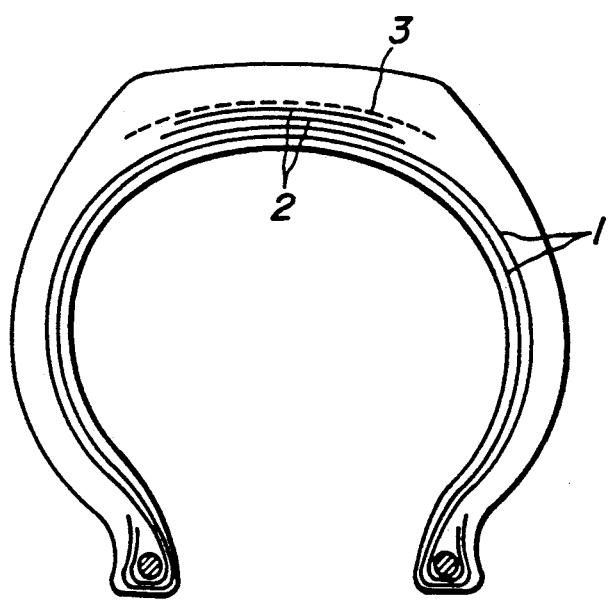

HEAVY DUTY PNEUMATIC RADIAL TIRES WHOSE BELT INCLUDES A PAIR OF NARROW-WIDTH AUXILIARY PROTECTIVE STRIPS

This application is a continuation-in-part the co-pending application Ser. No. 07/288,933 filed Dec. 23, 1988, now abandoned.

BACKGROUND OF THE INVENTION

1. Field of the Invention

This invention relates to heavy duty pneumatic radial tires, and more particularly to a belt structure of a heavy duty pneumatic radial tire such as off-the-road radial tire for construction vehicles which can improve a durability to belt end separation generated in the belt arranged radially outside a carcass ply when the tire is run on rough road at a high speed.

2. Related Art Statement

Heretofore, in order to restrain the belt end separation generated when the tire is run on rough road at a high speed, there have been known a structure wherein plural main belt layers 2 each containing substantially inextensible steel cords are arranged radially outside carcass plies 1 as shown in FIGS. 7 and 8 and an HE (high elongation) steel cord layer 3 having a width wider than those of the main belt layers is arranged on the main belt layers 2 to protect the belt ends 2a of the belt layers 2, a structure wherein a reinforcing layer 4 composed of fiber cords is placed on the belt ends 2a of the belt layers 2 as shown in FIG. 9, and the like.

In the structure of FIG. 8, however, the separation due to cracks generated at the belt end of the main belt layer 2 composed of substantially inextensible steel cords is restrained to some extent by the wide HE cord layer 3 acting as a protect belt layer for the main belt layer, but when a large input is locally applied to the tread through the riding on rocks or stones, since the width of the wide HE cord layer 3 becomes wider, a large strain is generated at the end portion of the wide HE cord layer 3 and hence cracks are produced in rubber in the vicinity of the end of the wide HE cord layer 3, resulting in the formation of nucleus for the separation failure. On the other hand, the structure of FIG. 9 mainly intends to suppress the size expansion through centrifugal force acting to the tread during high speed running as a passenger car tire and control the strain at the belt end and is generally composed of a nylon cord layer extending substantially in parallel to the circumferential direction, but is not so effective for suppressing a large strain locally produced at the belt end during the running. For example, the tire of this type having a tire size of 36.00 R51 is run on scattered rocks under a super-heavy load of about 46 tones per tire.

SUMMARY OF THE INVENTION

The inventors have made various experiments and found that when a pair of narrow-width auxiliary protective strips having free ends of cords at both side ends in axial direction are placed on a belt layer composed of steel cords so as to cover the belt end and protrude beyond the belt end outward in the radial direction, and the cord angle of the auxiliary protective strip has an optimum range for improving the durability to belt end separation.

According to the invention, there is the provision of a heavy duty pneumatic radial tire comprising a radial carcass ply of cords extending between a pair of bead cores in substantially a radial direction of the tire and turning up around the bead core, plural belt layers composed of at least two main belt layers each containing substantially inextensible steel cords arranged outside the radial carcass ply and at least one protect belt layer containing high elongation steel cords arranged outside the main belt layers, and at least a pair of narrow-width auxiliary protective strips having free ends of cords at both side ends in axial direction so as to cover the belt end and protrude beyond the belt end outward in the widthwise direction, cords of which strip having an inclination angle of 25°–50° with respect to the circumferential direction of the tire and being the same direction as in the cord direction of the belt layer supporting the auxiliary protective strip.

BRIEF DESCRIPTION OF THE DRAWINGS

The invention will be described with reference to the accompanying drawings, wherein:

FIG. 2 is a schematic view showing the belt structure of FIG. 1;

FIGS. 3 and 4a to 4d are schematic views of various embodiments of the belt structure according to the invention, respectively;

FIGS. 5 is a partly enlarged schematic view illustrating a principal strain acting to the belt end;

FIG. 6 is a graph showing a relation between cord angle of the auxiliary protective strip with respect to the circumferential direction and durability to belt end separation;

FIG. 7 is a schematically sectional view of the conventional tire; and

DESCRIPTION OF THE PREFERRED EMBODIMENTS

Figure 1:
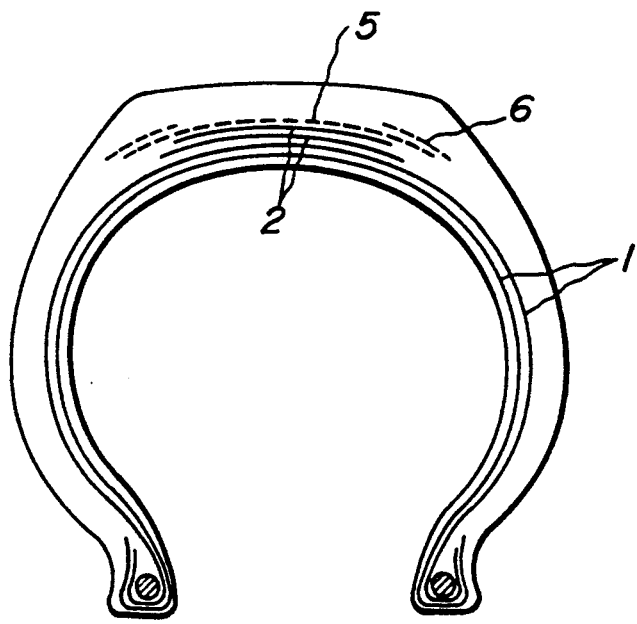
FIG. 1 is a schematically sectional view of a first embodiment of the tire having the belt structure according to the invention.
Figure 8:
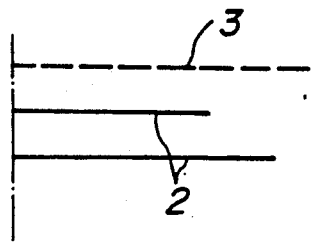
FIGS. 8 and 9 are schematic views of the conventional belt structures, respectively.
Figure 9:
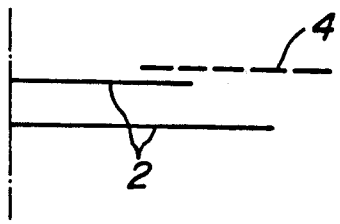

In general, strain resulting in the occurrence of belt end separation during the running on good road is an interlaminar shearing strain between belt layers. On the contrary, strain resulting in the occurrence of belt end separation during the running on rough road as previously mentioned (i.e. running on scattered large rocks or stones under super-heavy loading so as to produce a locally large input in the tread) is a strain in cord direction doing the separation of cord from rubber or a strain concentration in rubber at belt cord end generated due to the remarkable difference of rigidity between rubber and steel cord at the belt end. In the latter case, since the steel cord end is not adhered to rubber because of the exposure of the cord cut face not subjected to adhesion treatment, microcracks occur in the nonadhered portion at an initial running stage to act as a separation nucleus at steel cord and proceed and grow in an extending direction of steel cord with the lapse of time and finally connect with each other between the steel cords in the circumferential direction to cause the belt end separation.

The inventors have made various studies with respect to this phenomenon and found that it is very effective to mainly suppress principal strain acting to the belt end portion for the prevention of the belt end separation.

Furthermore, the inventors have made studies and examinations on tires having various steel cord belt structures, and found that the direction of axis of principal strain generated at the belt end through loading deformation is about 45°–50° with respect to the circumferential direction.

The invention will be described with respect to a means for preventing the occurrence of belt end separation due to principal strain.

FIG. 5 is a schematically plan view of a belt layer 3 exposed by taking out tread from the conventional tire shown in FIG. 7. Numeral 14 is a steel cord, numeral 15 an end of the belt layer 3, numeral 16 a rubber face of phantom microunit area touching with the belt end 15 and locating at substantially the same plane as the belt layer 3, and numeral 17 is a rubber between the steel cords 14. The principal strain acting to the rubber face 16 is analyzed as follows:

If a force is applied to the rubber face 16, it is decomposed into shearing strains ($\gamma_{yz}$, $\gamma_{yz}$) in parallel to the face and strains ($\epsilon_x$, $\epsilon_y$) perpendicular to the face. The shearing strain becomes zero at a plane 18 inclined at a certain angle with respect to an axis 20 parallel with the circumferential direction of the tire (equatorial plane), while the vertical strain is maximum at this plane 18. Such a maximum vertical strain is called as a principal strain, an axis of which is shown by numeral 19. Moreover, it has been confirmed that the direction of the axis 19 of principal strain is coincident with the direction of the steel cord and the angle $\alpha$ of this axis with respect to the circumferential direction of the tire is about 45°–50°.

In this connection, the inventors have found that since cracks at the steel cord end of the belt layer is generated by the strain in the cord direction among strains acting to the belt end, if a pair of narrow-width auxiliary protective strips each containing cords arranged in the direction of the axis of principal strain are arranged on the end portions of the belt layer to bear and absorb the strain in the steel cord direction, the durability to belt end separation in the steel cord belt layer can be improved. Furthermore, the inventors have made investigations with respect to a relation between the cord angle of the auxiliary protective strip to the circumferential direction and the durability to belt end separation in various embodiments of the tire as mentioned below to obtain results as shown in FIG. 6.

As seen from FIG. 6, in order to obtain an actually required level of the durability to belt end separation or a durability level of at least 125% ($L_1$–$L_2$) as compared with the conventional level Lo (100%), an optimum range is existent in the cord angle of the auxiliary protective strip with respect to the circumferential direction, and is 25°–50°. In this case, it is important that the cord end of the auxiliary protective strip protruding outward from the end of the belt layer is free because if the strip is subjected to folding or the like, the rigidity at the folded end becomes too high and hence the separation is caused from the folded end. Moreover, a curve in FIG. 6 is a master curve based on various data.

According to the invention, therefore, the auxiliary protective strip made from organic fiber cords or steel cords having an inclination angle of 25°–50° with respect to the circumferential direction is placed on an end portion of a belt layer having a maximum width among the protect belt layers of HE steel cords having an elongation at rapture of 4.0–8.0% and an inclination angle of 20°–40° with respect to the circumferential direction so a to cover such an end portion and protrude outward from the end portion, or it is placed on an end portion of a belt layer having a maximum width among the main belt layers of steel cords developing a hoop effect and having an elongation at rupture of 1.5–3.0% and an inclination angle of 10°–30° with respect to the circumferential direction so as to cover such an end portion and protrude outward from the end portion whereby the occurrence of initial crack from the nonadhered portion at steel cord belt end and the growth thereof can effectively be prevented.

As mentioned above, the axis of principal strain is the same as in the cord direction of the belt layer covered at its end portion with the auxiliary protective strip, so that the strain component growing rubber cracks at the belt end is an angular component in the cord direction among the principal strain acting to the belt end. Therefore, when the cord direction of the auxiliary protective strip is the same as in the cord direction of the belt layer and the inclination angle of the cord in the auxiliary protective strip with respect to the circumferential direction is 25°–50°, the strain in the steel cord direction among principal strain is suppressed and absorbed, whereby the durability to belt end separation can be made to a service level.

Moreover, it is not necessarily required that the cord angle of the auxiliary protective strip is coincident with the direction of the axis of principal strain. In order to make the value of principal strain small, it is desirable that the cord angle of the auxiliary protective strip with respect to the circumferential direction is made small. However, when the cord angle is too small, the strain becomes large at the cord end of the auxiliary protective strip and the separation failure is apt to be caused in the auxiliary protective strip itself. Therefore, the lower limit of the cord angle is preferably 25°. In this connection, the cord angle of the auxiliary protective strip is selected within a range of 25°–50° in accordance with the kind of the tire to be used and the service conditions.

The width w of the auxiliary protective strip as shown in FIG. 2 is preferable to be 10%–40% of a half width of the belt layer to be covered with the auxiliary protective strip. When the width is less than 10%, the effect is small and the required service level can not be obtained, while when it exceeds 40%, the separation is apt to be caused in the axial direction of the tire. According to the invention, it is important that the auxiliary protective strip is arranged so as to protrude outward from the end of the belt layer to be covered, whereby the strain component in the belt cord direction amount principal strain is effectively suppressed and absorbed by the protrusion of the strip. The protruded quantity p of the auxiliary protective strip is favorable to be 30%–65% of the width w of the strip.

As the cord of the auxiliary protective strip, use may be made of organic fiber cords such as nylon cord, polyester cord, Kevlar cord and the like or steel cord. Particularly, the steel cord may be used for super-large size tires. Furthermore, the combination of steel cord strip and organic fiber cord strip may be adopted in accordance with the use purpose.

In FIGS. 1 and 2 is shown a first embodiment of the heavy duty pneumatic radial tire according to the invention having a tire size of 18.00 R25, which comprises two main belt layers 2 made from substantially inextensible steel cords having a twisting structure of $1\times3+9+15$, a strength of rupture of 300 kg/cord, an elongation at rupture of 2.4% and an end count of 23 cords/5 cm, and a single protect belt layer 5 of HE steel cords having a twisting structure of 3×7, a strength at rupture of 170 kg/cord, an elongation at rupture of 6.4% and an end count of 14 cords/5cm and arranged outside the main belt layer 2 to have a width wider than that of the main belt layer 2. In this case, the angle of steel cord in the main belt layers 2 is 21° with respect to the circumferential direction, wherein the direction of steel cords in the first inner main belt layer is upward to the right and the direction of steel cords in the second outer main belt layer is upward to the left. Hereinafter, the cord angle and direction of 21° upward to the right are represented by R21°, and the cord angle and direction of 21° upward to the left are represented by L21°. The cord angle and direction of HE steel cords in the protect belt layer 5 is R21°. Furthermore, the half width of the main belt layers 2 is 170 mm in the first layer and 150 mm in the second layer, and the half width of the protect belt layer 5 is 190 mm. Moreover, a pair of auxiliary protective strips 6 each containing nylon cords of 1260 d/2 embedded at an end count of 50 cords/5 cm in a coating rubber and having a width w of 60 mm (corresponding to about 32% of the half width of the protect belt layer 5) are arranged on both end portions 5a of the protect belt layer 5 at a protruded quantity p of 30 mm (corresponding to about 50% of the width of the strip). The cord direction and angle of the strip 6 are R35°.

According to the invention, the steel cord in the main belt layer has a strength at rupture of 165–1,300 kg/cord, the steel cord in the protect belt layer has a strength at rupture of 120–350 kg/cord, and the steel cord in the auxiliary protective strip has a strength at rupture of 50–200 kg/cord.

FIG. 3 shows a second embodiment of the belt structure in the tire having a tire size of 18.00 R25 according to the invention, wherein two protect belt layers 5, 7 of the same HE steel cords as in the first embodiment having a maximum width at outermost side are arranged outside two main belt layers 2 of substantially inextensible steel cords having a twisting structure of 7×7+1, a strength at rupture of 400 kg/cord, an elongation at rupture of 2.5% and an end count of 21 cords/5 cm. Furthermore, two paris of auxiliary protective strips 6, 8 each made from the same material as in the first embodiment are arranged on both end portions 5a of the wider protect belt layer 5 and both end portions 2a of the wider main belt layer 2 so as to protrude a part of each strip outward from the end portion 5a, 2a of each of the belt layers 5, 2, respectively. The half width of the main belt layers 2 is 170 mm in the inner first layer and 140 mm in the outer second layer and the cord angle and direction of the first and second layers are R21° and L21°. The half width of the protect belt layers 5, 7 is 200 mm in the layer 5 and 160 mm in the layer 7 and the cord angle and direction of the layers 5, 7 are L21° and R21°. the width and protruded quantity of the strip 6 are 80 mm and 50 mm, and the width and protruded quantity of the strip 8 are 34 mm and 14 mm. The cord angle and direction of the strip 6 are L35° with respect to the layer 5, and the cord angle and direction of the strip 8 are R35° with respect to the inner first layer 2.

FIG. 4a shows a third embodiment of the belt structure in the tire having a tire size of 36.00 R51 according to the invention. In this case, the protect belt layer of HE steel cords having a maximum width is arranged outside three main belt layers 2 of substantially inextensible steel cords, and a second protect belt layer 9 of HE steel cords is arranged outside the layer 5. Furthermore, two pairs of auxiliary protective strips 6, 10 of nylon cords are arranged both end portions 5a of the protect belt layer 5 and both end portions 9a of the protect belt layer 9 so as to protrude a part of the strip outward from the end portion of each of the layers 5, 9, respectively, and a another pair of auxiliary protective strips 8 of steel cords is arranged outside both end portions 2a of the main belt layer 2 having a maximum width among the three main belt layers.

In the third embodiment, the structures of the protect belt layers 5, 9 are the same as in the first and second embodiments, and the structures of three main belt layers are the same as in the second embodiment. Moreover, the half width is 430 mm in the layer 5, 380 mm in the layer 9, 360 mm in the inner layer 2, 380 mm in the middle layer 2 and 320 mm in the outer layer 2.

The auxiliary protective strips 6, 10 are comprised of nylon cords of 1890 d/2 having an end count of 40 cords/5 cm, and the auxiliary protective strip 8 is comprised of steel cords having a twisting structure of 1×3+9+15+1, a strength at rupture of 180 kg/cord and an end count of 23 cords/5 cm.

In the three main belt layers 2, the cord angle and direction of steel cord is R40° in the first inner layer, R23° in the second middle layer and L23° in the third outer layer, while the cord angle and direction of HE steel cord are R23° in the layer 5 and L23° in the layer 9.

On the other hand, the cord angle and direction of the auxiliary protective strip are R35° in the strip 6, L35° in the strip 10 and R35° in the strip 8. The width and protruded quantity of the auxiliary protective strip are 150 mm and 75 mm in the strip 6, 100 mm and 50 mm in the strip 10, and 100 mm and 50 mm in the strip 8.

In a fourth embodiment, the material, width and protruded quantity of the auxiliary protective strip 8 covering the end portion 2a of the main belt layer 2 as shown in FIG. 4a are the same as in the auxiliary protective strip 6 of the third embodiment.

In a fifth embodiment, all of the auxiliary protective strips 6, 10 and 8 as shown in FIG. 4a are the same as in the strip 8 of the third embodiment.

FIG. 4b shows a sixth embodiment of the belt structure according to the invention, which is a modification of the fourth embodiment of FIG. 4a. That is, the auxiliary protective strips 11, 12 and 13 each composed of two superimposed nylon cord layers are arranged on end portions 5a, 9a and 2a of the protect belt layers 5 and 9 and the main belt layer 2, respectively, so as to protrude a part of the strip outward from each end portion of the layers. Each of these strips is comprised of nylon cords of 1890 d/2 at an end count of 40 cords /5 cm. The width and protruded quantity of the strip are 150 mm and 70 mm in the strip 11, 150 mm and 80 mm in the strip 12, and 150 mm and 70 mm in the strip 13. Moreover, the two layers constituting each of the strips 11, 12 and 13 have the same width and are substantially aligned at their ends. The cord angle and direction of each of the strips are the same side as in the layer to be covered and are L30° in the strip 11, R30° in the strip 12 and L30° in the strip 13. On the other hand, the main belt layers 2 and protect belt layers 5, 9 are the same as in the embodiment of FIG. 4a.

FIG. 4c shows a seventh embodiment of the belt structure according to the invention, which is a modification of FIG. 4b. That is, each of the auxiliary protective strips 11', 12' and 13' is the same as in the strips 11, 12 and 13 of FIG. 4b, except that two layers constituting each of the strips 11', 12' and 13' are shifted to each other at a shifting quantity s of 25 mm. The protruded quantity p in the strips 11', 12' and 13' is larger by about 12 mm than that of the embodiment of FIG. 4b and the protruded quantity $p_1$ is smaller by about 12 mm than that of FIG. 4b.

FIG. 4d shows an eighth embodiment of the belt structure according to the invention, which is another modification of FIG. 4b. That is, each of the auxiliary protective strips 11", 12" and 13" is a combination of narrow-width steel cord layer and wide-width nylon cord layer, wherein the strips 11", 12" and 13" are arranged on both end portions 5a, 9a and 2a of the protect belt layers 5 and 9 and the main belt layer 2, respectively, so as to protrude a part of the strip outward from the end portion of the layer. In these strips 11", 12" and 13", the nylon cord layer is piled on the steel cord layer so as to have an approximately equal step s at both sides. The widths w and $w_1$ and protruded quantities p and $p_1$ of the nylon cord layer and steel cord layer are common in the strips 11", 12" and 13" and are w=150 mm, $w_1$=100 mm, p=75 mm and $p_1$=50 mm, respectively. Moreover, the structure of the steel cord layer is the same as in the strip 8 of the third embodiment, the structure of the nylon cord layer is the same as in the strips 6, 10 of the third embodiment, and the main belt layer 2 and the protect belt layers 5. 9 are the same as in the third embodiment.

In order to confirm the effect of the invention, there were provided five test tires having a tire size of 18.00 R25 as shown in the following Table 1 and thirteen test tires having a tire size of 36.00 R51 as shown in the following Table 2, respectively. Then, these test tires were subjected to a durability test on a drum, from which the durability to belt end separation was evaluated by an index on the basis that the control tire was 100.

In Table 1, the tire of Run No. 1 was the conventional tire having no auxiliary protective strip as shown in FIG. 7 as a control tire, the tire of Run No. 2 was a comparative tire obtained by removing the auxiliary protective strip from the tire of FIG. 3, the tire of Run No. 3 was the aforementioned first embodiment of the tire as shown in FIG. 1, the tire of Run No. 4 was the aforementioned second embodiment of the tire as shown in FIG. 3, and the tire of Run No. 5 was a modified tire of the aforementioned third embodiment shown in FIG. 4a having a tire size of 18.00 R25.

In Table 2, the tire of Run No. 6 was a control tire obtained by removing the auxiliary protective strip from the tire of FIG. 4a, the tire of Run No. 7, was the third embodiment of the tire as shown in FIG. 4a, the tire of Run No. 8 was the aforementioned fourth embodiment of the tire as shown in FIG. 4a, the tire of Run No. 9 was the aforementioned fifth embodiment of the tire as shown in FIG. 4a, the tire of Run No. 10 was the aforementioned sixth embodiment as shown in FIG. 4b, the tire of Run No. 11 was the aforementioned seventh embodiment of the tire as shown in FIG. 4c, the tire of Run No. 12 was the aforementioned eighth embodiment of the tire as shown in FIG. 4d, the tire of Run No. 13 was a modified tire of the fifth embodiment as shown in FIG. 4a obtained by replacing the strip 8 with the strip 10 of the fourth embodiment, the tire of Run No. 14 was a modified tire of the fifth embodiment as shown in FIG. 4a obtained by replacing the strip 6 with the strip 6 of the fourth embodiment and the strip 8 with the strip 13' of the seventh embodiment, respectively, the tire of Run No. 15 was a modified tire of the eighth embodiment as shown in FIG. 4d obtained by removing the strip 13', the tire of Run No. 16 was a modified tire of the seventh embodiment as shown in FIG. 4c obtained by using steel cords instead of nylon cords in the strip 13' provided that s=25 mm, w=100 mm, p=60 mm and $p_1$=35 mm, the tire of Run No. 17 was a modified tire of the seventh embodiment as shown in FIG. 4c obtained by replacing all of the strips 11', 12' and 13' with the strip 13' having the same construction as in Run No. 16, and the tire of Run No. 18 was a modified tire of the eighth embodiment as shown in FIG. 4d obtained by using wide-width steel cord layer instead of the wide-width nylon cords layer in all of the strips.

TABLE 1

| Run No. | 1 (control) | 2 | 3 | 4 | 5 |
|---|---|---|---|---|---|
| Index of durability to belt end separation | 100 | 110 | 125 | 145 | 180 |

TABLE 2

| Run No. | 6 (control) | 7 | 8 | 9 | 10 | 11 | 12 | 13 | 14 | 15 | 16 | 17 | 18 |
|---|---|---|---|---|---|---|---|---|---|---|---|---|---|
| Index of durability to belt end separation | 100 | 130 | 120 | 140 | 140 | 145 | 150 | 130 | 140 | 140 | 150 | 155 | 160 |

As seen from Tables 1 and 2, the invention has an effect of considerably improving the belt durability.

What is claimed is:

1. A heavy duty pneumatic radial tire comprising: a radial carcass ply of cords extending between a pair of bead cores in substantially a radial direction of the tire and turning up around respective bead cores, plural belt layers comprising two main belt layers each containing substantially inextensible steel cords arranged outside the radial carcass ply and a protect belt layer containing high elongation steel cords arranged outside the main belt layers, and a pair of narrow-width auxiliary protective strips having free ends of cords at both side ends in axial direction to cover the belt end and protrude beyond the belt end outward in the widthwise direction, cords of said protective strips having an inclination angle of 25°-50° with respect to the circumferential direction of the tire and being the same direction as in the cord direction of the belt layer supporting the auxiliary protective strip.

2. The heavy duty pneumatic radial tire according to claim 1, wherein said auxiliary protective strips contains organic fiber cords or steel cords.

3. The heavy duty pneumatic radial tire according to claim 1, wherein said auxiliary protective strips have a width corresponding to 10-40% of a half width of said belt layer to be covered and a protruded quantity corresponding to 30-65% of the width of said auxiliary protective strips.

4. The heavy duty pneumatic radial tire according to claim 1, wherein said main belt layer have a cord angle of 10°–30° with respect to the circumferential direction of the tire, and said protect belt layer has a cord angle of 20°–40° with respect to the circumferential direction.

5. The heavy duty pneumatic radial tire according to claim 1, wherein steel cord in said main belt layers have an elongation at rupture of 1.5–3.0%, and a steel cord in said protect belt layer has an elongation at rupture of 4.0–8.0%.

6. The heavy duty pneumatic radial tire according to claim 1, wherein a pair of said auxiliary protective strips cover both end portions of said protect belt layer.

7. The heavy duty pneumatic radial tire according to claim 1, wherein both end portions of one of said plural belt layers are covered with a pair of said auxiliary protective strips.

8. The heavy duty pneumatic radial tire according to claim 1, wherein both end portions of a main belt layer having a maximum width among said plural main belt layers are further covered with a pair of said auxiliary protective strips.

9. The heavy duty pneumatic radial tire according to claim 1, wherein said auxiliary protective strips are a combination of two organic fiber cord layers or two steel cord layers or an organic fiber cord layer and a steel cord layer.

10. The heavy duty pneumatic radial tire according to claim 9, wherein said auxiliary protective strips are a combination of an organic fiber cord layer and a steel cord layer, said steel cord layer arranged on an end portion of said belt layer to be covered and said organic fiber cord layer arranged on said steel cord layer, and a width of said steel cord layer is narrower than that of said organic fiber cord layer.

11. The heavy duty pneumatic radial tire according to claim 9, wherein said organic fiber cord layers include nylon cords.

12. The heavy duty pneumatic radial tire according to claim 8, wherein said auxiliary protective strips for covering said protect belt layer include organic fiber cords and said auxiliary protective strips for covering said main belt layer include steel cord.

* * * * *